US012803368B2

(12) United States Patent
Hummel

(10) Patent No.: US 12,803,368 B2
(45) Date of Patent: Nov. 17, 2026

(54) ELECTRIC MOTOR WITH A COOLING CHANNEL

(71) Applicant: BorgWarner Inc., Auburn Hills, MI (US)

(72) Inventor: Benedikt Hummel, Zweibrücken (DE)

(73) Assignee: BORGWARNER INC., Auburn Hills, MI (US)

( * ) Notice: Subject to any disclaimer, the term of this patent is extended or adjusted under 35 U.S.C. 154(b) by 203 days.

(21) Appl. No.: 18/769,458

(22) Filed: Jul. 11, 2024

(65) Prior Publication Data

US 2025/0030301 A1 Jan. 23, 2025

(30) Foreign Application Priority Data

Jul. 21, 2023 (DE) ......................... 102023119323.6

(51) Int. Cl.
*H02K 1/20* (2006.01)
*H02K 5/10* (2006.01)
(Continued)

(52) U.S. Cl.
CPC ................. *H02K 5/20* (2013.01); *H02K 1/20* (2013.01); *H02K 5/10* (2013.01); *H02K 5/225* (2013.01);
(Continued)

(58) Field of Classification Search
CPC ............ H02K 5/20; H02K 5/10; H02K 5/225; H02K 5/203; H02K 1/20; H02K 11/30;
(Continued)

(56) References Cited

U.S. PATENT DOCUMENTS 10,746,450 B2 8/2020 Chretien et al.
2018/0252219 A1* 9/2018 Bohl .................. F04D 25/0606
(Continued)

FOREIGN PATENT DOCUMENTS

DE 19637192 A1 * 4/1998 ............... H02K 3/50
DE 102008046446 A1 * 3/2010 ............... H02K 9/02
(Continued)

OTHER PUBLICATIONS

Machine translation of DE-102018126775-B4 (Year: 2022).*
(Continued)

*Primary Examiner* — Michael Andrews
(74) *Attorney, Agent, or Firm* — Howard & Howard Attorneys PLLC

(57) ABSTRACT

An electric motor is described, with a stator, a rotor surrounding the stator, a shaft connected to the rotor in a rotationally fixed manner, a first housing component and a second housing component, which together enclose a motor compartment in which the rotor and the stator are arranged, wherein a first end of the shaft is arranged in the motor compartment, and a second end of the shaft protrudes from an opening of the second housing component. It is envisaged that the first housing component, together with a third housing component, encloses an electronics compartment in which control electronics are arranged, wherein a wall of the first housing component separates the motor compartment from the electronics compartment, and the control electronics have a circuit board whose board plane faces the said wall.

7 Claims, 3 Drawing Sheets

(51) Int. Cl.
*H02K 5/20* (2006.01)
*H02K 5/22* (2006.01)
*H02K 11/30* (2016.01)

(52) U.S. Cl.
CPC .......... *H02K 11/30* (2016.01); *H02K 2211/03* (2013.01)

(58) Field of Classification Search
CPC . H02K 11/33; H02K 2203/03; H02K 2211/03
USPC ......................................... 310/58, 59, 71, 89
See application file for complete search history.

(56) References Cited

U.S. PATENT DOCUMENTS

| | | | | |
|---|---|---|---|---|
| 2021/0180609 A1* | 6/2021 | Geue | ........................ | H02K 1/32 |
| 2022/0294303 A1* | 9/2022 | Lauer | ...................... | F01L 1/352 |

FOREIGN PATENT DOCUMENTS

| | | | | | |
|---|---|---|---|---|---|
| DE | 102018100985 | A1 | | 7/2018 | |
| DE | 102018222734 | A1 | | 6/2020 | |
| DE | 102018126775 | B4 | * | 7/2022 | ........... F04D 29/628 |
| EP | 3091637 | B1 | * | 10/2018 | ............. H02K 5/203 |

OTHER PUBLICATIONS

Machine translation of EP-3091637-B1 (Year: 2018).*
Machine translation of DE-102008046446-A1 (Year: 2010).*
Machine translation of DE-19637192-A1 (Year: 1998).*

* cited by examiner

ELECTRIC MOTOR WITH A COOLING CHANNEL

CROSS REFERENCE TO RELATED APPLICATIONS

This application claims the priority to German Patent Application No. DE102023119323.6 filed on Jul. 21, 2023, and the entire content of this priority application is incorporated herein by reference in its entirety.

TECHNICAL FIELD

The disclosure is based on an electric motor, as are of known art, for example, from EP 3 091 637 B1.

BACKGROUND

Such electric motors may be used in motor vehicles, for example to drive a fan. Manufacturers are increasingly required to equip such electric motors with control electronics, thereby reducing the load on the vehicle's engine control unit.

An object of at least some implementations of the present disclosure is to demonstrate a way in which an electric motor of the aforementioned type can be equipped with control electronics in a cost-effective and space-saving manner.

This object is achieved by means of an electric motor. Advantageous refinements of the disclosure are the subject matter of dependent claims.

SUMMARY

An electric motor may comprise a first housing component and a second housing component, which together enclose a motor compartment in which a rotor and a stator, together with one end of the shaft, are arranged. The first housing component and a third housing component together enclose an electronics compartment, in which are arranged control electronics which, when in operation, control the power supply to stator windings and the operation of the electric motor. Here a wall of the first housing component separates the motor compartment from the electronics compartment, and the control electronics comprise a circuit board, whose board plane faces the said wall. The board plane can, for example, run at right angles to the geometric longitudinal axis of the shaft.

In this way, the control electronics can be integrated into a compact electric motor. By using the first housing component for both the motor compartment and the electronics compartment, the total number of components required can be kept relatively low, which enables cost-effective production. Since the circuit board of the control electronics faces a wall of the first housing component, the axial length of the electric motor is advantageously increased only slightly by the control electronics.

An advantageous refinement of the disclosure provides that the motor compartment and the electronics compartment are sealed against each other. Both the electronics compartment and the motor compartment can be sealed against the ingress of water, for example by the arrangement of ring seals between the first and second housing components, and also between the first and third housing components.

A further advantageous refinement of the disclosure is that the first housing component has an inlet and an outlet for coolant, and that the electric motor has a cooling channel for cooling the stator and the control electronics. Here the whole of the cooling channel, or a section of the cooling channel, may run along the wall of the first housing component that separates the motor compartment from the electronics compartment. The first housing component may, for example, carry a cooling plate, and an electronic component of the control electronics may abut against one face of the cooling plate, while the cooling channel flows along an opposite face of the cooling plate. The cooling plate may be integrally designed with the first housing component, or can be attached to the first housing component as a separate component, for example by means of welding, or a screwed form of connection. A cooling channel section that flows along the cooling plate can cool an electronic component of the control electronics very efficiently. A further cooling channel section may run in an interior space enclosed by the stator, and may thereby cool the stator.

A further advantageous refinement of the disclosure envisages that the first housing component has a housing opening, in which is mounted an electrical plug connector, which is connected to the control electronics. In this way, production can advantageously be simplified. The second and third housing components can then have simple configurations, and can easily be connected to the first housing component.

BRIEF DESCRIPTION OF THE DRAWINGS

Further details and advantages of the disclosure are explained with reference to an example of embodiment and the attached drawings. Here.

DETAILED DESCRIPTION

Figure 1:
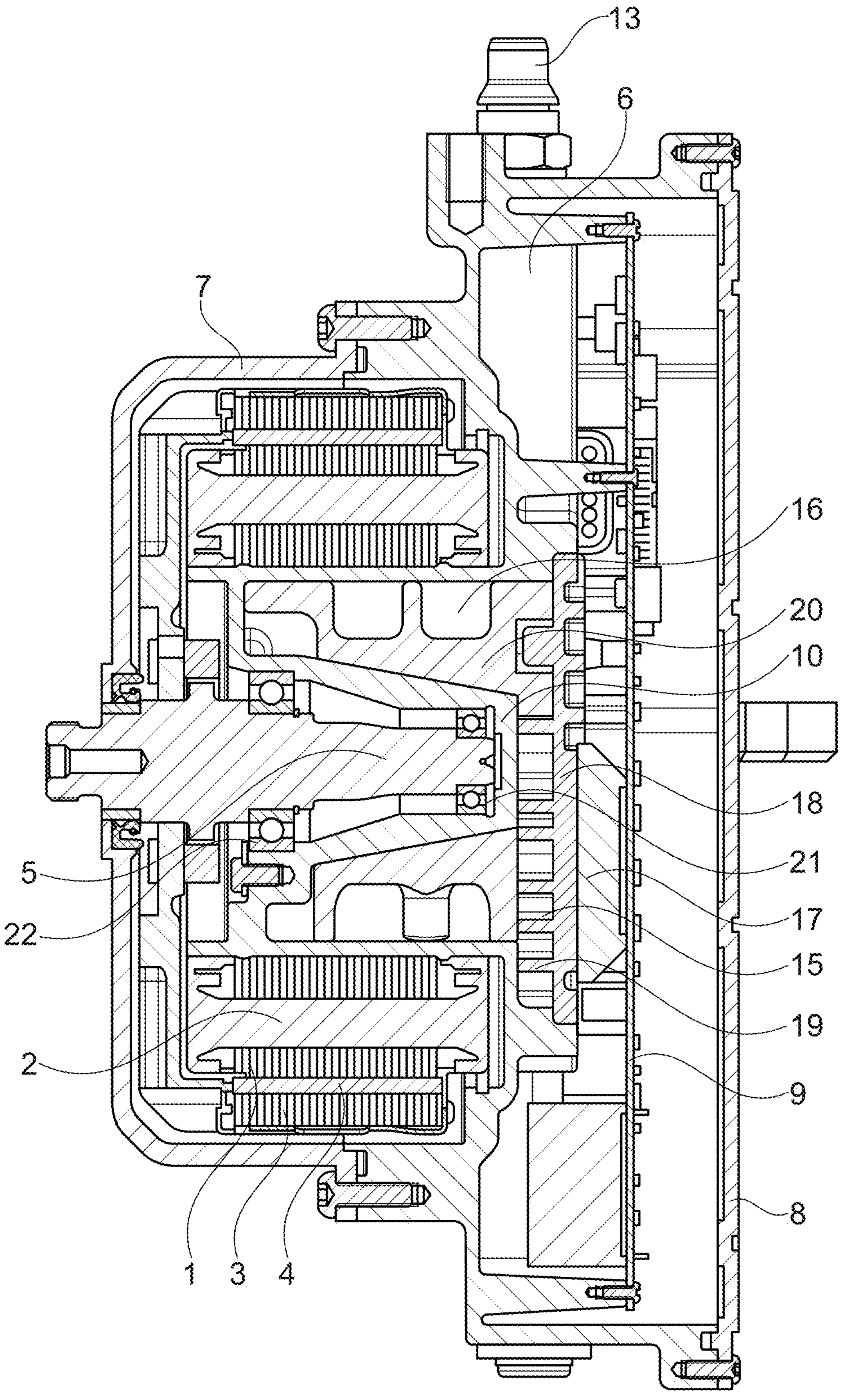
FIG. 1 shows a cross-sectional view of an example of embodiment of an electric motor.

The electric motor shown in the figures comprises a stator 1 with stator windings 2, a rotor 3 with permanent magnets 4, and a shaft 5 that is connected to the rotor 3 in a rotationally fixed manner, for example by means of a screwed form of connection, or welding. Rotor 3 and stator 1 are enclosed in a motor compartment, which is defined by a first housing component 6 and a second housing component 7. The second housing component 7 has an opening, from which the shaft 5 protrudes.

Together with a third housing component 8, the first housing component 6 defines an electronics compartment, in which is arranged a circuit board 9 with control electronics. The motor compartment and the electronics compartment are separated from each other by a wall 10 of the first housing component 6. The circuit board 9 faces the said wall 10, that is to say, it is orientated essentially at right angles to the longitudinal axis of the shaft 5. The motor compartment and the electronics compartment are sealed from each other. Electrical cables, which connect the stator windings 2 to the circuit board 9 of the control electronics, are routed through scaled openings in the wall 10 of the first housing component 6.

Figure 2:
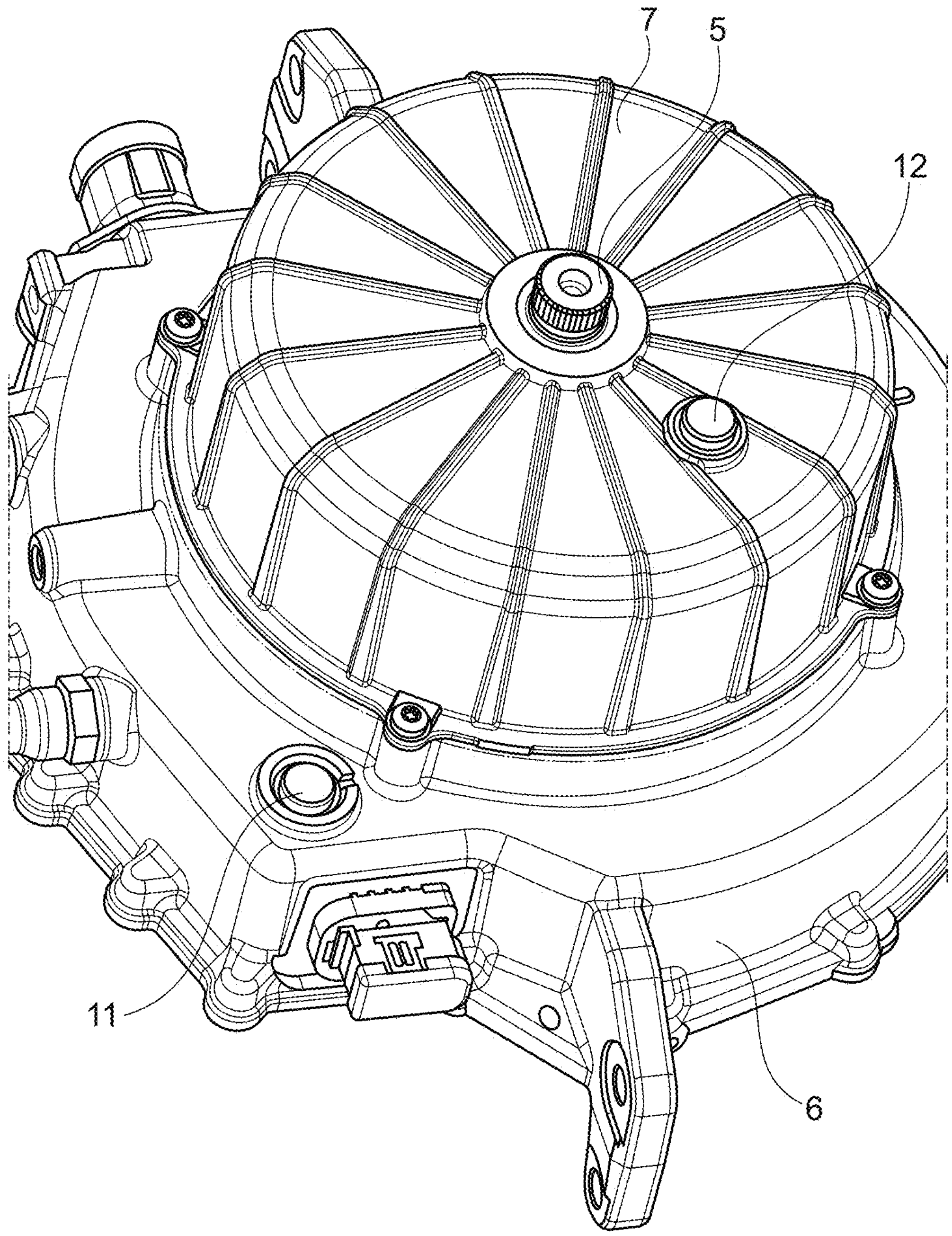
FIG. 2 shows another view of the electric motor.
Figure 3:
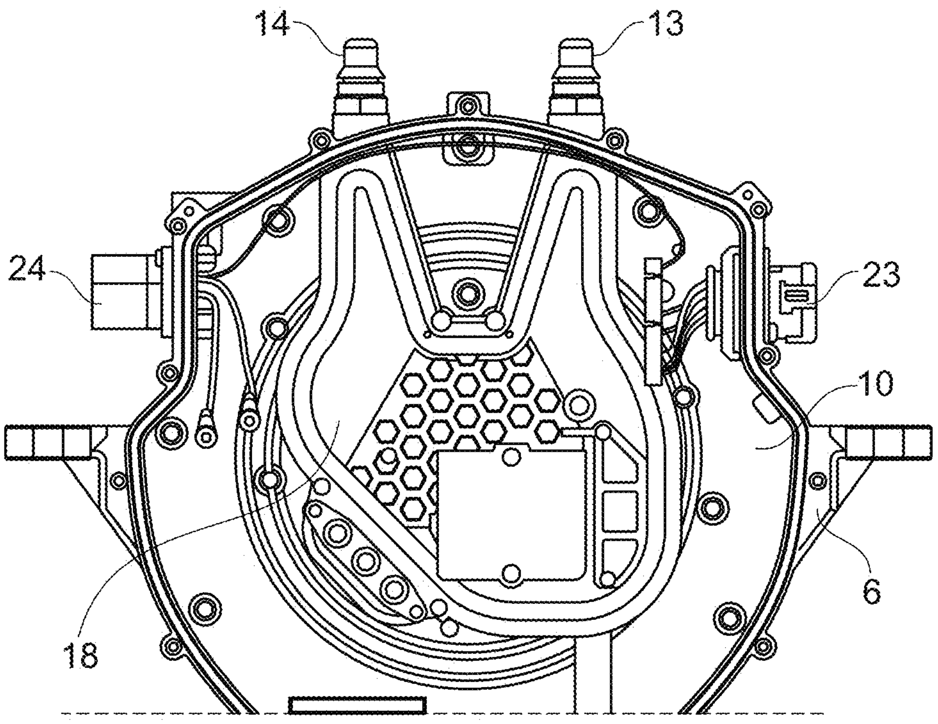
FIG. 3 shows a view of the electric motor without the third housing component and without the circuit board.
Figure 4:
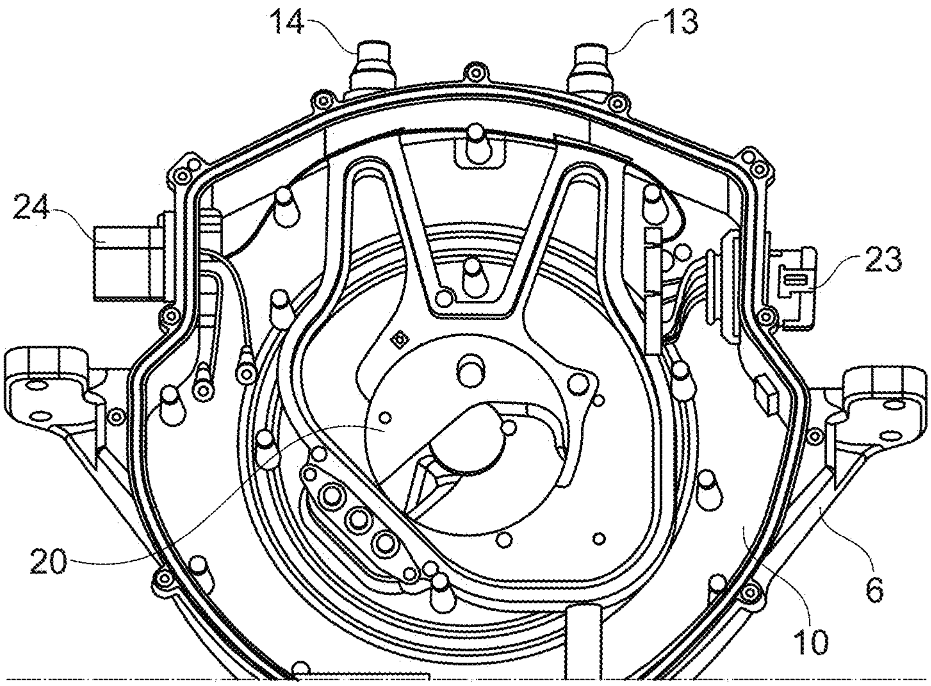
FIG. 4 shows a view as in FIG. 3, without the cooling plate.

The electronics compartment and the motor compartment each have a pressure equalization opening 11, 12, which is closed with a membrane that is permeable to air, and impermeable to water in liquid form. In the example of embodiment shown in FIG. 2, the pressure equalization opening 11 of the electronics compartment is arranged in the first housing component 6, and the pressure equalization opening 12 of the motor compartment is arranged in the second housing component 7. However, it is also possible to arrange both pressure equalization openings 11, 12 in the first housing component 6.

The first housing component 6 has an inlet 13 and an outlet 14 for coolant. A cooling channel, which leads from the inlet 13 to the outlet 14, has a channel section 15 for cooling an electronic component 17 of the control electronics, and a channel section 16 for cooling the stator 1. The channel sections 15, 16 are connected in series. In the example of embodiment shown, the cooling channel section 15 for cooling the electronic component 17 is arranged upstream of the channel section 16 for cooling the stator 1. However, it is also possible for the flow to pass through the cooling channel section 15 only after the flow passes through the cooling channel section 16.

The first housing component 6 carries a cooling plate 18, along the lower face of which a coolant flows when the motor is in operation. For example, the cooling plate 18, together with the wall 10, which separates the engine compartment from the electronics compartment, can define a start and an end section of the cooling channel, which may also be the cooling channel section 15 for cooling the electronic component 17 of the control electronics. One or a plurality of the electronic components 17 of the control electronics abut against the upper face of the cooling plate 18. To improve heat dissipation, the cooling plate 18 can have protuberances 19 on its lower face, which protrude into the cooling channel section 15.

The cooling channel section 16 for cooling the stator 1 runs in an interior space surrounded by the stator 1. The said cooling channel section 16 is thereby also bounded by the wall 10, which separates the motor compartment from the electronics compartment. In the example of embodiment shown, the wall 10 forms an annular space surrounded by the stator 1, into which space an insert 20 is inserted, which, together with the wall 10, defines the cooling channel section 16. However, the insert 10 can also be formed in one piece with the first housing component 6.

The annular space defined by the wall 10, in which the cooling channel section 16 runs for purposes of cooling the stator 1, surrounds an end section of the shaft 5 and bearings 21, 22 of the shaft 5. The cooling channel section 16 thereby also causes the bearings 21, 22 of the shaft 5 to be cooled.

The housing of the electric motor carries a plurality of electrical connectors 23, 24 for purposes of power supply and communication with the control electronics. The plug connectors 23, 24 are attached to the first housing component.

The invention claimed is:

1. An electric motor comprising:

a stator, a rotor surrounding the stator, a shaft connected to the rotor in a rotationally fixed manner, a first housing component and a second housing component, which together enclose a motor compartment, in which the rotor and the stator are arranged, wherein a first end of the shaft is arranged in the motor compartment and a second end of the shaft protrudes from an opening of the second housing component, the first housing component, together with a third housing component, encloses an electronics compartment in which control electronics are arranged, a wall of the first housing component separates the motor compartment from the electronics compartment, the control electronics have a circuit board, whose board plane faces the wall, wherein the first housing component has an inlet and an outlet for coolant, a cooling channel for purposes of cooling the stator and the control electronics, wherein the first housing component carries a cooling plate, and an electronic component of the control electronics abuts against one face of the cooling plate, while the cooling channel runs along an opposite face of the cooling plate, wherein the cooling plate has protuberances that protrude into the cooling channel, wherein the wall of the first housing component forms an annular space surrounded by the stator, and an insert that is inserted into the annular space, and wherein the insert together with the wall defines a cooling channel section for cooling the stator.

2. The electric motor in accordance with claim 1, wherein the electronics compartment and the motor compartment are sealed against each other.

3. The electric motor in accordance with claim 1, wherein the electronics compartment and the motor compartment each have a pressure equalization opening, which is closed by a membrane which is permeable to air, and impermeable to water in liquid form.

4. The electric motor in accordance with claim 1, wherein the cooling channel runs along the wall that separates the motor compartment from the electronics compartment.

5. The electric motor in accordance with claim 1, wherein the cooling channel leads through an interior space surrounded by the stator, which space is bounded by the wall of the first housing component.

6. The electric motor in accordance with claim 1, wherein the cooling channel has cooling channel sections, arranged one behind the other, for purposes of cooling the control electronics and the stator.

7. The electric motor in accordance with claim 1, wherein the first housing component has a housing opening in which an electrical plug connector is mounted, which is connected to the control electronics.

* * * * *